May 12, 1959  P. C. HUNGERFORD, JR., ET AL  2,885,896
PLURAL SPEED DRIVING MECHANISMS
Filed Nov. 25, 1957

INVENTORS
P. C. HUNGERFORD JR.
D. R. TOMKO
By George M. Souly
ATTORNEY

United States Patent Office 2,885,896
Patented May 12, 1959

2,885,896

PLURAL SPEED DRIVING MECHANISMS

Philip C. Hungerford, Jr., Cleveland Heights, and Donald R. Tomko, Cleveland, Ohio, assignors to Curtiss-Wright Corporation, a corporation of Delaware Application November 25, 1957, Serial No. 698,484

12 Claims. (Cl. 74—217)

The invention relates to a plural speed driving mechanism suitable for automatic machinery wherein the work has to be driven through successively active speed change steps differing widely from each other in rate and through the use of coil or spring clutch elements capable of simple and effectual automatic control. As is well known, spring or coil clutches are inherently unstable, going from disengaged to engaged condition practically instantaneously and without slip or feathering action, thereby compelling acceleration from one speed to another to take place in a negligible amount of time, hence being accompanied by considerable shock to the clutch spring and other components of the clutch or connected shafting. One object of the present invention is to provide a simple, compact and efficient two and/or three speed, readily controllable, spring clutch mechanism having provision for shock absorbing slip upon occurrence of temporary overloading of a predetermined magnitude.

As illustrated herewith, the present invention is embodied in a mechanism which provides for transmitting torque from (e.g.) a conventional electric motor output shaft or main driving member to a load at three speed ratios determined by (e.g.) permanently connected pulleys and belts. Low speed is accomplished through a self-energizing overrunning clutch spring in a clutch unit which also contains an additional overrunning, self-energizing clutch spring and cooperating means capable of transmitting the motor torque to the driven member of the mechanism as a whole at two higher speeds and with provision for shock absorbing slip at any change of speed from low speed to either intermediate or high and between intermediate and high speed. The operations of the "additional" clutch spring are controlled, via portions of the ratio-determining drive, by separate couplings capable of selective operation to connect the motor output shaft with respective portions of the "additional" clutch spring and cooperating means as will be more fully explained. The low speed driving clutch features can, of course, be omitted if only two speed ratio are required in an installation. Similarly, for a two speed drive, the illustrated provision for intermediate speed driving could be omitted.

Figure 1:
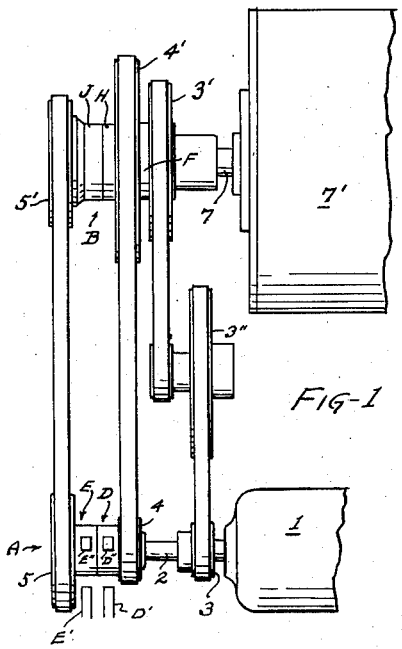
Figure 2:
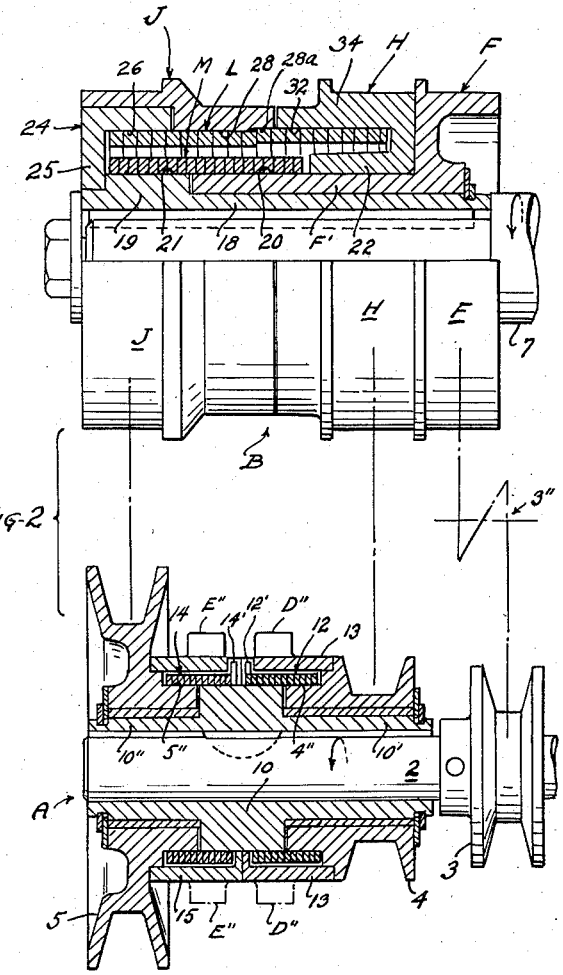
Figure 3:
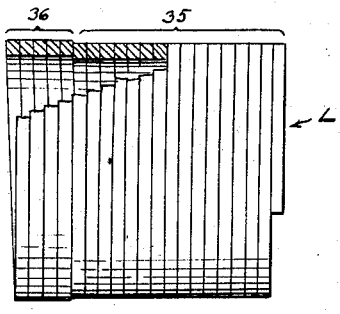
Figure 4:
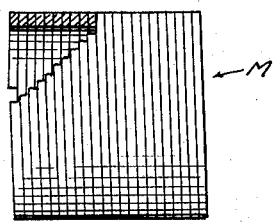
Figure 5:
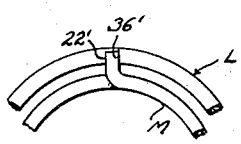

In the drawings, Fig. 1 is a more or less schematic view showing or indicating a motor 1, a typical load 7 and two clutch units A and B with an interconnecting belt drive. Fig. 2 is a view showing each of the clutch units A and B at least partially in axial central cross section, and further indicating diagrammatically the interconnecting belt drive. Fig. 3 is a fragmentary sectional view showing the preferred clutch spring L of unit B for driving the load at intermediate and high speed and performing the slip function. Fig. 4 is a similar view showing the preferred clutch spring M of the unit B for accomplishing low speed drive. Fig. 5 is an end view of the two clutch springs L and M according to Figs. 3 and 4 as they may be arranged for causing the clutch spring M, through its associated drums, to modify the slip function of the clutch spring L as will be explained.

As a typical method of using the illustrated clutch mechanisms, electric motor 1, Fig. 1, has a suitable output shaft 2 or driving member for the present mechanism connected with and/or supporting a low speed driving pulley 3 and a selective clutch or coupling unit A comprising independently actuatable clutch portions E and D having output drive pulleys 4 and 5 respectively. The two portions E and D of unit A have independently operable actuators D' and E' controlled by any suitable means, not shown. The pulleys 3, 4 and 5 are connected as shown or indicated to pulleys 3', 4' and 5' respectively of the clutch unit B (see Fig. 2) rigid with concentric, relatively rotatable, hub or drum members F, H and J of that unit. The output shaft 7 of clutch unit B is connected to the load 7' which, by way of example, may be considered as representing the tumbler of an automatic laundry machine requiring rotation at rather widely different speeds during successive portions of complete washing and drying operations. Low speed pulleys 3 and 3', as shown, are interconnected by an auxiliary speed reduction idler arrangement 3" of conventional form. All belts and coacting pulleys are preferably of the positive drive type (i.e.) incapable of slippage such as could permit undesired variations in performance time at particular speeds.

The belt and pulley relationships shown in Fig. 1 may be assumed as: Low speed reduction ratio 1:30; intermediate speed ratio 1:8, and high speed ratio 1:3. Assuming the laundering operations commence at low speed and continue through high speed, pronounced shock loads would normally occur at each change. The difference in rate between intermediate and high speeds is something more than twice that between low and intermediate speeds. The present mechanism can also enable direct change from low to high speed without imposition of destructive shocks.

The motor-connected externally actuated dual clutch assembly A, as shown, includes a single input drum member 10 with hubs 10' and 10", the member 10 being suitably secured to the motor output shaft 2. Selective operation of pulleys 4 and 5 is accomplished through relatively reversely wound clutch springs 12 and 14, each of which bridges across a surface portion of drum member 10 to a drum surface 4" or 5" formed on the hub of the associated pulley. The clutch springs 12 and 14 are self-energizing on their drums and each has one end attached as by a toe portion (12' or 14' of the respective springs) to an actuator sleeve 13 or 15. The sleeves are suitably journalled on the assembly for independent rotation with the respective clutch springs 12 and 14. Thus clutch spring 12 is in interference fitting relationship to its associated surface portion of drum 10 and drum surface 4" of pulley 4 so that if the control sleeve 13 is allowed to turn with the drum 10 of the motor shaft 2, the clutch spring automatically grips its two drums and drives the pulley 4 at the speed of the shaft. Control sleeve 15 is similarly arranged for permitting clutch spring 14 to grip and forcing it to release one of its associated drum surfaces. Each portion D and E of the dual clutch A (see Fig. 1) is rendered inactive or is disengaged when the actuating rods D' and E' are moved into the paths of rotation of shoulders D" and E" respectively on the sleeves 13 and 15. Either such negatively actuated clutch arrangement as just described could be replaced by one requiring positive actuation operation, but the illustrated type is less expensive, requires less axial space and has certain operational advantages as will be explained. Preferably the clutch springs 12 and 14 are more heavily preloaded for energization (interference fit) on the pulley drum surfaces 4″ and 5″ than on the associated portions of drum member 10 so that, during deenergization, the coils associated with the drum member 10, will be completely free from the associated surfaces of member 10. When deenergized, the coils associated with the pulley drum surfaces thereby act as friction brakes with tendency to restrain rotation of the associated pulleys.

Referring to clutch assembly or unit B as shown in Fig. 2, the unit may be supported by a suitable shaft adapter or output clutch drum member 18 keyed or splined to an end portion of a suitably supported and load-connected driven or ultimate clutch output shaft or member 7 and secured against axial movement thereon by suitable means such as clearly illustrated. Shaft adapter 18, preferably steel, has a relatively large diameter generally cylindrical drum portion 19, and the hub or input clutch drum member F of or for the pulley 3′, preferably bearing material such as Phosphor bronze, is journalled for free angular movement on the shaft adapter 18 while being prevented from axial displacement out of position thereon. An external drum surface 20 of a sleeve portion F′ of hub or drum member F and an external clutch drum surface 21 of the shaft adpater 18 are of approximately equal outer diameter as shown and the clutch spring M (full floating type) is formed with uniform diameter coils (see Fig. 4) in interference fitting, hence self-energizing relationship to respective external drum surfaces 20 and 21. In the illustrated design (Fig. 2), the larger number of uniform diameter coils of spring M in contact with relatively soft drum surface 20 than are in contact with steel surface 21 tends to equalize the torque capacities of the clutch spring M at respective sides of the cross-over region by compensating for the differences in coefficient of friction between the spring material and the drum materials.

When the motor 1 is energized, and the spring clutch couples D and E of unit A are deenergized, the load-connected driven or clutch output shaft 7 will be turned at relatively low speed; and it will be apparent that when the shaft 7 is driven at higher speeds than that of hub or input clutch drum member F, the spring M will simply overrun, as on the drum surface 21 of shaft adapter 18, but at lower relative speeds than if, for example, an operatingly similar overrunning clutch coupling were to be provided instead between the drive pulley 3 and motor shaft 2 or were to be embodied in the idler mechanism 3″.

For the direction of rotation of shafts 2 and 7 indicated conventionally at the right of each in Fig. 2, clutch spring 12 of unit A is left hand wound (spring 14 being right hand wound); clutch spring M of unit B is right hand wound, and clutch spring L of unit B is left hand wound. Thereby the necessary clutch coil energization and overrunning operations, particularly in unit B, take place automatically. In clutch unit A both clutch springs 12 and 14 as shown, are of the contracting-to-grip type as in the spring M of unit B, and in the latter unit spring L is of the expanding-to-grip type. However, theoretically or operationally the types are interchangeable as in practically all helical coil or spring clutches.

The selective connection between pulleys 4 and 5 of clutch unit A and the load-connected or ultimate driven shaft 7 in clutch unit B, through pulleys 4′ and 5′, comprises, in part, an internal cup-shaped clutch output drum member 24 having a disc portion 25 suitably secured to turn with the shaft adapter or clutch output drum portion 19 (fastening not shown) and having an internal clutch drum surface 26 in surrounding and in radially spaced relationship to the overrunning clutch spring M. A sleeve portion of the input hub or drum member J of and for pulley 5′ is journalled to turn freely as on the outer peripheral surface of internal drum member 24. The sleeve portion of hub or internal drum member J has an internal input clutch drum surface 28 of substantially the same diameter as the internal output drum surface 26. The hub or internal input drum member H of the intermediate speed drive pulley 4′ has an inner sleeve portion 22 journalled for free angular movement on a sleeve portion F′ of hub or external drum member F. One end of sleeve portion 22 forms an axial positioning surface for the clutch spring M, the opposite end surface of input hub or drum member H being held in position axially through the illustrated association with clutch input hub or drum member F. An outer sleeve portion 34 of input hub or drum member H has an internal clutch drum surface 32 in radially spaced relationship to sleeve portion 22 and slightly larger in diameter than the main portion of internal drum surface 28 of input hub or drum J.

Hub or drum members H and J, depending upon which portion D or E of clutch unit A is rendered active or is energized, drive the load-connected drum member 24 through the intermediary of the single full floating type clutch spring L which has portions in telescoping and preloaded or interference fitting relationship to all three drum surfaces 26, 28 and 32. The preloaded relationships, however, are importantly different from each other as will be explained.

Referring to Fig. 3, the greater length portion 35 of clutch spring L has all its coils formed on approximately equal diameters and the difference in preloading of coils against drum surface 28 and drum surface 32 is due to the relatively stepped relationship between surfaces 28 and 32 as shown in Fig. 2. Coil portion 36, left Fig. 3, is on the other hand, originally formed with larger coils than any of the rest so that its extra amount of preloading will not require formation of the drum surfaces 26 and 28 with different diameters at the spring crossover region or otherwhere, and particularly so that, when overrunning is required on part of the clutch spring L, it will be on the drum surfaces of hub or internal input drum members H and/or J, so that any wearing of output drum surface 26 and the associated spring coils will occur only when shock-absorbing slip occurs.

The controlled slip feature of the present invention is accomplished partly by limiting the number of coils of the spring L in contact with internal drum surface 26 of output drum member 24 and having sufficient preloading of the spring or relative interference fit between spring and drum surfaces so that the spring will be able to transmit considerably more than the normally required torque under each of its operating conditions particularly for intermediate and high speed drive. The design of the clutch spring L (coils 36 and internal output drum surface 26) is such that somewhat more than twice the torque required for continuous operation at intermediate speed can be transmitted but with the necessary slippage during acceleration so that no critical or destructive shock will occur. Such design insures driving of the same load at high speed since less transmitted torque will be required at that speed.

In order that the necessary difference in diameter between the internal drum surfaces of input hub or drum members J and H will not be at the crossover region for the clutch spring, the internal drum surface portion 28a of drum surface 28 is made substantially the diameter of internal drum surface 32 of input hub or drum member H, or, in other words, the necessary step is on the internal drum surface 28.

During the operation of the present mechanism at low speed, both of the clutch portions D and E of dual clutch unit A are deenergized or disconnected from the motor shaft, whereupon, through inertia and friction, the hub or drum members H and J will be at rest or stationary. At the same time, because of the high preloading of coils 36 or clutch spring L in or against internal drum surface 26 of internal output drum member 24, the clutch spring L will be turned at the speed of the output or driven shaft 7 causing coils 35 of the spring L to overrun in the drum surfaces of the hub or internal drum members H and J. The stationary condition of input or hub or drum members H and J is more or less assured by the fact that the control sleeves 13 and 15 hence the clutch springs 12 and 14 of dual clutch unit A are prevented from rotating. Thereby although the coils of those two clutch springs could, at the time, overrun on the pulley-associated drums 4″ and 5″ the coils serve instead as brakes coupled with the inertia of the pulleys and connecting belting.

Assurance that the braking torque of clutch springs 12 and 14 of dual clutch unit A will be effective to hold hub or drum members H and J stationary during low speed drive by the present mechanism or at other times can be had by increased overrunning friction of the clutch springs 12 and 14 against drum surfaces 4″ and 5″ respectively of the drive pulleys 4 and 5, and this can be accentuated by appropriate reduction of friction between those pulleys and the hubs of drum member 10. Anti-friction bearings, for example, can be used in clutch unit A in place of the illustrated bushing bearings.

For accomplishing intermediate speed drive, the clutching portion D of unit A is rendered operative by withdrawal of actuating rod D′ thus allowing the clutch spring 12 to grip both its associated drums. The relatively light interference fitting or preloading of coils 35 of clutch spring L against drum surface 32 of hub or drum member H now maintains energization of the clutch spring in member H and the relatively heavily preloaded coils 36 drive the internal drum member 24, hence the load-connected or driven shaft 7. The hub or drum member J is, of course, forced to turn with the clutch spring L as an idle driven member causing overrunning of the drum surface 5″ of pulley 5 (unit A) with respect to the now stationary coils of clutch spring 14. Similarly the external drum surface 21 on the output shaft adapter 18 of unit B overruns the clutch spring M at a relative speed equal to the difference between low and intermediate output speed. During acceleration from low to intermediate speed the heavily preloaded coils 36 of clutch spring L slide on the internal drum surface 26 until the shaft 7 attains its proper speed, thereby absorbing the shock which would have occurred in event of substantially instantaneous acceleration between those two speeds.

For high speed operation, clutch portion E of unit A is actuated by withdrawal of actuating rod E′ so that hub or internal input drum member J is driven at the least amount of reduction from the speed of motor 1 as will be evident from Fig. 1. Since the coils 35 of clutch spring L have a lighter preloading in internal drum surface 32 of input hub or drum member H than is the case between those same coils and the drum surface 28 of input hub or drum member J, the coils will now overrun in or against internal drum surface 32 of member H. Arresting of member H can, if necessary, be assured by deactuation of control clutch portion D (e.g.) simultaneously with actuation of portion E of unit A, thereby arresting clutch spring 12 of unit A, causing the spring 12 to act as a brake on pulley 4. Again the shock load during acceleration from intermediate speed to high speed is absorbed by the necessary slippage of coils 36 of clutch spring L in the internal output drum surface 26. During high speed driving the clutch spring M overruns on shaft adapter external output drum surface 21 at a relative speed equal to the difference between high and low output speed.

During high speed operation as just above described, energization of clutch spring L for transmission of torque through the spring L from hub or drum member J to output drum member 24 requires that the energizing torque of coils 35 against the internal drum surface 28 of hub or drum member J shall be greater than the friction force between the coils 35 and internal drum surface 32 of hub or driven member H regardless of whether member H, during high speed drive, is stationary or is compelled to turn at its intermediate driving speed as by leaving clutch portion D or unit A in an energized condition upon actuation of portion E of clutch unit A for effecting high speed drive. If, for example, the overrunning friction through coil contact with internal drum surface 32 of input hub H equalled the effective friction of coils 35 in internal drum surface 28 of hub or drum member J, then there would be no assured energization of clutch spring L purely as a function of turning of input hub or drum member J at the high speed. It is, of course, evident that if the preloading of coils 35 against internal drum surface 32 of hub or drum member H were to be greater than the preloading against drum surface 28 of hub or drum member J, then deenergization of all coils associated with internal drum surface 28 of hub J would result, and driving at high speed could not occur.

If desired the coils 36 of clutch spring L can, in effect, be connected to a terminal portion of the low speed driving clutch spring M of unit B as slip of the clutch coils 36 occurs against the internal drum surface 26 of output drum member 24, so that resistance to overrunning on part of spring 22 on external drum surface 21 will augment the slip resistance of coils 36. One manner of operative connection is exhibited in Fig. 5 wherein clutch spring M has a toe portion 22′ positioned for abutment by the coil terminal shoulder 36′ of spring L. There is no need for any attachment or joint between the two clutch springs because once any prearranged spacing between the abutment surfaces has been taken up, then the clutch spring M will always bear the abutment relationship to such terminal shoulder as shown in Fig. 5. This is evident because the two clutch springs at the left of their respective crossover regions engage permanently interconnected internal and external drum surfaces and because, by design, overrun of the clutch spring M can be caused always to occur on external output drum surface 21 rather than on external input drum surface 20.

We claim:

1. In a torque transmitting mechanism arranged for connecting a rotary power source to a rotary load at two different speed ratios, a clutch unit comprising an output clutch drum adapted for connection to the load, two relatively rotatable and axially adjacent input clutch drums supported coaxially with the output drum, one adjacent thereto, all the drums having peripheral clutching surfaces facing in a common direction radially, a single helical clutch spring having coils disposed in frictional torque-transmitting peripheral contact with the output drum surface and other coils disposed in self-energizing frictional contact with respective input drum surfaces and being otherwise unattached to the input drums so as to enable overrunning of the spring thereon, and means connected to drive the input clutch drums at relatively different speeds.

2. The mechanism according to claim 1, wherein the first mentioned coils of the clutch spring are designed to transmit a limited amount of torque to the load, such as to be enabled to slip temporarily on the output drum during change from one speed ratio to the other.

3. The mechanism according to claim 1, wherein coils of the clutch spring disposed for contact with the input drum which is axially adjacent to the output drum are in more heavily preloaded or higher interference fitting relationship to that input drum than are coils of the spring with respect to the other input drum.

4. A coil or spring clutch unit, comprising an output clutch drum adapted for connection to drive a load, two relatively rotatable input clutch drums coaxial therewith and rotatable relative to each other so as to be capable of driving the output drum at relatively different speeds, and a single full floating type helical clutch spring with similarly radially disposed coil surface portions in preloaded relationship to all three drums and capable of overrunning thereon.

5. In a spring clutch unit, a first clutch drum, a second or intermediate clutch drum and a third clutch drum, all in coaxial relationship and relatively rotatable, said drums having peripheral clutching surfaces facing radially in a common direction, a single clutch spring with coils in interference fitting self-energizing relationship to the clutching surfaces of all three drums, particularly characterized in that the clutch spring is otherwise unattached to the first drum and the intermediate drum, thus enabling the clutch spring to overrun both those drums in one direction, and, additionally, coils of the spring have a greater degree of interference fitting relationship to the second or intermediate drum than with respect to the first drum, so that overruning of the spring on the first drum cannot deenergize the coils associated with the intermediate drum.

6. In a torque transmitting mechanism for connecting a rotary power source to a rotary load at two different speed ratios, three coaxial clutch drums, a single helical clutch spring with coil portions in interference fitting self-energizing relationship to similarly disposed surfaces of the three drums, means connecting one of the drums with the load, the clutch spring being capable of overrunning on the other two drums, a rotary driving member and separate means operable to connect the member to said other two drums in relatively low and high ratios, one of said separate means including an overrunning clutch coupling operative selectively to connect the driving member to one of said other drums and to disconnect the driving member therefrom.

7. In a torque transmitting mechanism for connecting a rotary driving member to a rotary driven member at three different speed ratios, two overrunning, externally actuatable clutches connected to be driven by the driving member, the mechanism having three coaxial independently rotatable input clutch drum members two having internal clutch surfaces and the third having an external clutch surface, means including said two overrunning clutches arranged to couple the driving member with said input drum members respectively in three mutually different speed ratios, one internal output drum member and one external output drum member, each permanently connected with the driven member, a first overrunning full floating type clutch spring in bridging relation to the two external drum members, a second overrunning full floating type clutch spring bridging all three internal drum members, the second clutch spring being heavily preloaded in its associated internal output drum member, being less heavily preloaded in the internal input drum member which lies adjacent to the internal output drum member and being still less heavily preloaded in the other internal input drum member.

8. A spring clutch mechanism adapted for unidirectional transmission of torque to a rotary load, said clutch mechanism comprising a first, a second and a third input drum member coaxial with each other and rotatable relative to each other and two output drum members connected to the rotary load, two relatively oppositely wound clutch springs, a first in bridging relation to a drum surface of the first input drum member and one of the output drum members and being self-energizing on both those drum members so as to be capable of overrunning on either, a second clutch spring bridging the first and second input drum members and the other output drum member and being in self-energizing preloaded relationship to each of those drum members so as to be capable of overrunning on any one of the three, said second clutch spring having a lesser number of coils in contact with its associated output drum member than are in contact with either the second or third input drum members and so preloaded thereon that temporary slippage under overload will occur between said second clutch spring and its associated output drum member, and means arranged to drive the first, second and third input drum members at relatively different speeds.

9. The clutch mechanism according to claim 8, wherein terminal portions of the two clutch springs respectively associated with the output drum members are in abutting relationship circumferentially so that when slip occurs between said second clutch spring and its associated output drum member the slippage will be resisted in part by overrunning drag of the first clutch spring on its assocated output drum member.

10. In a three speed power transmission, a rotary driving means, a rotary load connected member, a spring clutch unit comprising a first input drum member, a second input drum member and a third input drum member, all journalled for independent rotation about the axis of the load connected member, the first input drum member having an external peripheral clutching surface portion and the second and third input drum members having internal peripheral clutching surface portions adjacent to each other, an external output clutch drum axially adjacent the external drum surface of the first input drum member and secured to the load connected member, an internal output clutch drum secured to the load connected member and disposed adjacent said third input drum member, an overrunning full floating contracting-to-grip clutch spring bridging the external drum surfaces, an expanding-to-grip clutch spring bridging all the internal drum surfaces, said two clutch springs being relatively oppositely wound so that each is adapted to transmit torque in a single direction to the load connected member, the expanding-to-grip clutch spring being in relatively heavy interference fitting contact with the internal output drum surface, in less heavy interference fitting contact with the drum surface of the third input drum member, and in still less heavy interference fitting contact with the drum surface of the second input drum member, and means respectively connecting the first, second and third input drum members to the rotary driving means so that the first input drum member is driven at relatively low speed, the second at an intermediate speed and the third at relatively high speed, said means including two independently actuatable overrunning clutches between the rotary driving means and said second and third drum members.

11. A three speed torque transmitting mechanism comprising, a drive shaft adapted for rotation by a motor, two self-energizing overrunning spring clutches connected to the drive shaft and including independently journalled driven drum members and associated helical clutch springs preloaded for overrunning on the drum members and means for deactuating the spring clutches by arresting rotation of their clutch springs, a driven shaft adapted for connection to a load, a spring clutch mechanism having first, second and third input clutch drum members journalled for independent rotation about the axis of the driven shaft, means permanently connecting the drive shaft to the first drum member for rotation thereof at low speed, a first output clutch drum member connected for rotation with the driven shaft and an overrunning helical clutch spring bridging the drum surfaces of the first input and output drum members and being self energizing thereon, a second output drum member connected for rotation with the driven shaft, and a helical clutch spring in bridging self energizing relation to the second output drum member and to the drum surfaces of the second and third input drum members, both helical springs of said clutch mechanism being wound for transmission of torque in a common direction through their associated input and output drum surfaces, and means interconnecting the output drums of the first described spring clutches respectively to said second and third input drum members of said clutch mechanism in relatively different ratios higher than the low speed ratio.

12. A coil or spring clutch unit, comprising three coaxial, relatively rotatable clutch drums, one intermediately of the other two and all having similarly radially disposed clutching surfaces, a single clutch spring operatingly bridging all three drums, elastically preloaded thereon, being in full floating overrunning relationship to the intermediate drum and one of the other drums, the preloading of coils on the intermediate drum being greater than on said one of the other drums, so that overrunning of the spring on said one drum cannot deenergize the coils associated with the intermediate drum.

References Cited in the file of this patent

UNITED STATES PATENTS

| | | |
|---|---|---|
| 1,629,420 | Starkey | May 17, 1927 |
| 1,861,931 | Moldenhauer | June 7, 1932 |
| 2,622,450 | Gorske et al. | Dec. 23, 1952 |
| 2,660,899 | McCammon | Dec. 1, 1953 |